Dec. 17, 1963    G. D. RHOADS ETAL    3,114,558
FLUID SEAL
Original Filed July 1, 1957
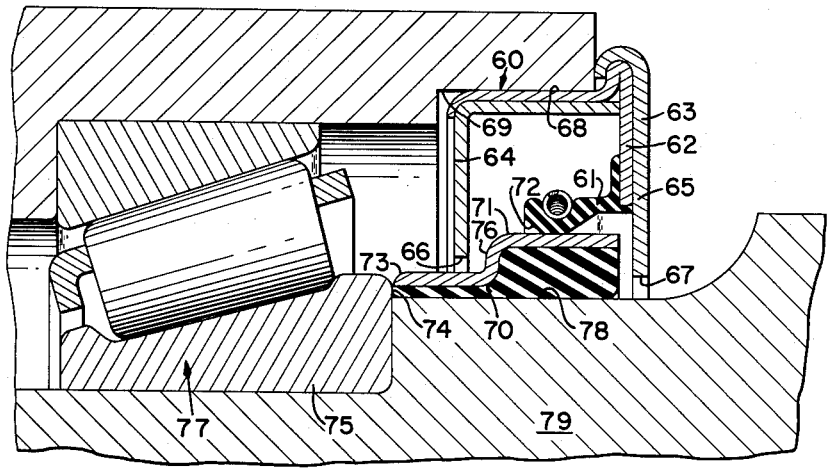
INVENTORS
GEORGE D. RHOADS
GEORGE L. CORSI
BY
ATTORNEYS

United States Patent Office 3,114,558
Patented Dec. 17, 1963

3,114,558
FLUID SEAL
George D. Rhoads, Redwood City, Calif., and George L. Corsi, Detroit, Mich., assignors to Federal-Mogul-Bower Bearings, Inc., Detroit, Mich., a corporation of Michigan
Original application July 1, 1957, Ser. No. 699,018, now Patent No. 3,011,814, dated Dec. 8, 1961. Divided and this application July 10, 1961, Ser. No. 130,715
2 Claims. (Cl. 277—37)

This invention relates to an improved fluid-sealing device. This application is a division of application Serial Number 669,018, filed July 1, 1957, now U.S. Patent No. 3,011,814.

One important application of this new device is in sealing oil in the bearings of rear-wheel axles of automotive trucks. Since that application illustrates the nature and type of many of the problems solved by this invention, it will be used as an illustrative example. However, the principles of the invention are obviously not confined to this one particular application; so no limitation on this invention is intended by use of this example.

In the past, oil seals wore deep grooves into truck-rear-wheel axle housings. Replaceable metal wear sleeves were resorted to, but they themselves gave rise to problems. For one thing, their installation, removal, and replacement was difficult and time-consuming. An old wear sleeve was either split by a cold chisel, or driven off the axle in an operation that often took a quarter of an hour or longer. Then the new wear sleeve had to be driven on. The requirement of a tight press fit usually called for heating the new sleeve, driving it on the axle, and shrinking it into a tight fit at the desired location. This took another fifteen minutes or so and was in addition to the time it took to put in the new oil seal. Moreover, installation and removal resulted in scoring the axle housing, and the new wear ring itself was often scratched and scored during installation. Such damage to the wear ring often resulted in a surface that made accurate sealing impossible, and the seal leaked through no fault of the oil-sealing element, the leakage occuring between the wear ring and the axle housing.

Being a separate piece, the wear rings were shipped, stored, catalogued, and sold separately. Not only was this a nuisance and added expense, but the handling required was another cause of damage to the sealing surface. Furthermore, the wear rings were often made by a different manufacturer than the oil seals and, in that event, the oil-seal manufacturer had no control over the quality of the surface against which his product had to seal.

An object of the present invention is to provide a unitary device combining a novel type of wear sleeve with the oil seal as a separately rotatable but still integral part thereof.

Another object is to provide an assembly incorporating both the oil seal and wear ring in a unit that remains together during shipment, installation, operation, and removal.

Another object is to simplify installation and removal of the oil seal and wear ring and to safeguard the sealing surfaces during installation.

In general, the unit of this invention comprises a cup-shaped rigid case with a pair of spaced-apart radial flanges joined by a cylindrical wall that is itself adapted for a press fit into a housing bore. An oil-sealing member is supported in the case in a leak-tight fit, its sealing lip lying in between the radial flanges and opposite the cylindrical wall. A wear sleeve is also provided, comprising a resilient, shaft-engaging member adapted for a press-fit with the axle or other shaft, and a rigid reinforcing member with a cylindrical outer periphery that is engaged by the sealing lip in a rotating, oil-sealing relationship. The rigid member has at least a substantial portion which has a larger diameter than the inner pierce of the radial flanges of the case, and it is located between these flanges, the axial extent of this portion being shorter than the distance between the flanges but not unduly so. As a result, the wear sleeve cannot come out of the case and is always in engagement with the oil-sealing lip. The whole is made, sold, delivered, installed, operated, and removed as a unit. The use of the resilient, inner, shaft-engaging member simplifies installation and removal without in the least impairing the operation of the device.

Other objects and advantages of the invention will appear from the following description of some illustrative examples.

The drawing is an enlarged fragmentary view in elevation and in section of a portion of a rear-wheel truck bearing installation in which the device of the present invention is installed.

Referring to the drawing, a radial shaft seal 60 has its sealing element 61 bonded to an intermediate element 62 of a tripartite cup-shaped rigid case 63, preferably of metal. This type of oil seal is not essential and is merely one example of a suitable oil seal. The case 63 also includes a pair of radial flanges 64 and 65, with pierces 66 and 67, and a cylindrical wall 68, that fits in a bore 69. A rigid wear ring 70, preferably of steel, is stepped to provide a cylindrical portion 71 engaged by the sealing lip 72, the portion 71 being of greater diameter than the pierces 66 and 67. There is also a cylindrical portion 73 of smaller diameter than the pierce 66 that extends out beyond the seal case 63 into engagement with a radial edge 74 of a bearing cone 75. Thus, during installation of this seal the cone 75 prevents the step 76 from engaging the radial flange 64. During removal, the portion 73 helps drive out the bearing 77. An elastomer lining 78 engages the axle housing 79 in a press fit. It may be made from any suitable oil-resistant elastomer such as neoprene or other synthetic rubber; for purposes not involving oil, other materials are also suitable. It should, however, be resilient. The shaft interference of the lining 78 with the axle housing 79 should be enough to assure against leakage or rotation but with less friction than the interference of the case cylindrical portion 68 with its bore 69.

To those skilled in the art to which this invention relates, many additional changes in construction and widely differing embodiments of the invention will suggest themselves without departing from the spirit and scope of the invention as defined in the claims.

What is claimed is:

1. An assembly for sealing between a bore and a shaft, including in combination: a rigid case having a pair of spaced-apart radial flanges joined by a radially outer cylindrical wall adapted for press fit into said bore; an annular radial shaft seal supported in said case in a leak-tight fit therewith and having an annular sealing lip opposite said cylindrical wall and between said radial flanges; and a wear sleeve having a resilient portion providing a radially inner periphery and adapted for a non-rotating fit on said shaft, and having a rigid metal reinforcing portion stepped to provide a cylindrical portion and an axially extending portion of smaller diameter than both said cylindrical portion and one of said radial flanges, said cylindrical portion having a radially outer periphery, the diameter of said outer periphery being greater than that of the inner peripheries of said spaced-apart radial flanges, the axial length of said outer periphery being shorter than the distance between said radial flanges, said cylindrical portion being positioned between said flanges with said sealing lip engaging its said outer periphery being thereby trapped in said case between said flanges so as to unitize said case, seal, and wear sleeve into a single assembly, said axially extending portion projecting out through and beyond said one radial flange to limit axial movement thereof upon engagement against something, thereby spacing said seal away from that thing.

2. An assembly for sealing between a bore and a shaft wherein the shaft is provided with shoulder means adjacent an inner end to which said assembly is to extend, said assembly including in combination: a rigid case having a pair of spaced-apart radial flanges joined by a radially outer cylindrical wall adapted for press fit into said bore, one of said bore and said case having stop means for limiting the insertion of said case into said bore at a point where said case has been inserted a distance short of said shoulder; an annular radial shaft seal supported in said case in a leak-tight fit therewith and having an annular sealing lip opposite said cylindrical wall and between said radial flanges; and a wear sleeve having a resilient portion providing a radially inner periphery and adapted for a non-rotating fit on said shaft, and having a rigid metal reinforcing portion stepped to provide a cylindrical portion and an axially extending portion of smaller diameter than said cylindrical portion and of smaller diameter than one of said radial flanges, said cylindrical portion having a radially outer periphery, engaged by said lip, the diameter of said outer periphery being greater than that of the inner peripheries of said spaced-apart radial flanges, the axial length of said outer periphery being shorter than the distance between said radial flanges, said cylindrical portion being positioned between said flanges, said cylindrical portion thereby being trapped in said case between said flanges so as to unitize said case, seal, and wear sleeve into a single assembly, said axially extending portion projecting out through and beyond said one radial flange and into contact with said shoulder means thereby spacing said seal from said shoulder means.

References Cited in the file of this patent
UNITED STATES PATENTS

| | | |
|---|---|---|
| 2,266,175 | Dalaval-Crow | Dec. 16, 1941 |
| 2,342,955 | Mayer | Feb. 29, 1944 |